Oct. 31, 1933.   O. KASELITZ   1,932,590
METHOD OF PRODUCING BROMINATED ORGANIC COMPOUNDS
Filed June 11, 1932
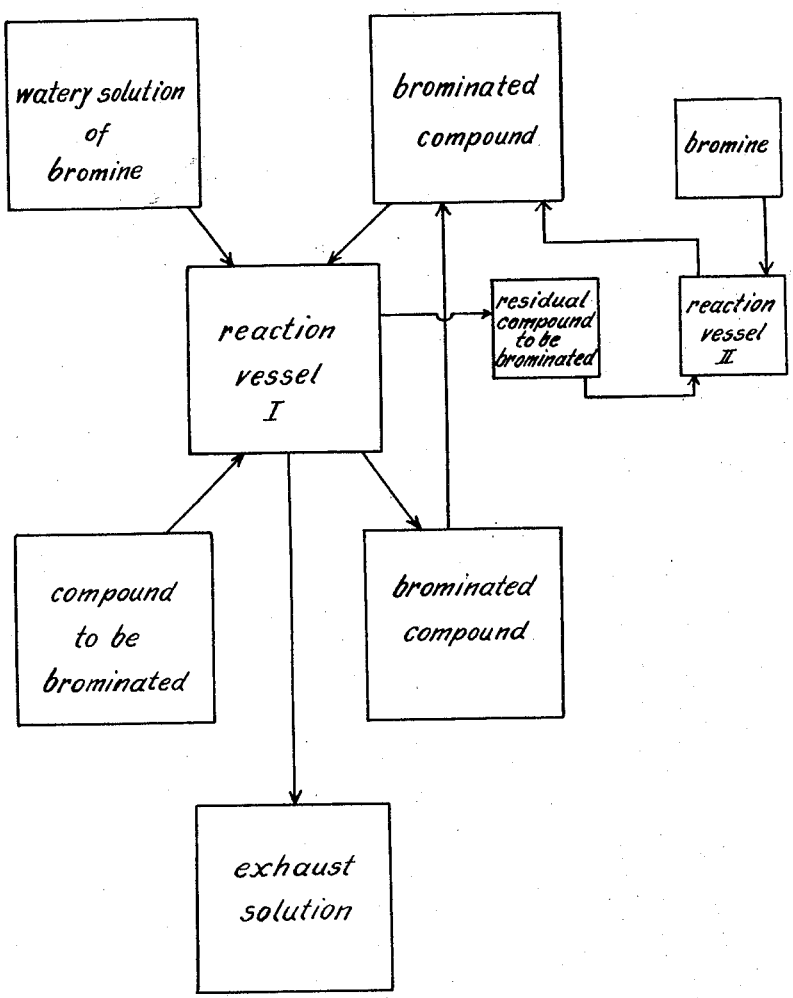
Inventor:
Oskar Kaselitz
by Karlikshanij
Atty.

Patented Oct. 31, 1933

1,932,590

UNITED STATES PATENT OFFICE 1,932,590

METHOD OF PRODUCING BROMINATED ORGANIC COMPOUNDS

Oskar Kaselitz, Berlin, Germany

Application June 11, 1932, Serial No. 616,721, and in Germany December 16, 1931

4 Claims. (Cl. 260—162)

My invention refers to the bromination of compounds and more particularly to means for brominating unsaturated organic compounds. It is an object of my invention to provide means whereby dilute watery bromine solutions can be directly used in the brominating step.

When brominating ethylene ($C_2H_4$) or acetylene ($C_2H_2$) or other unsaturated organic compounds in order to produce ethylene dibromide ($CH_2Br\ CH_2Br$), ethylene tetra bromide ($CHBr_2\ CHBr_2$) or the like it is usual to introduce the unsaturated compound into liquid bromine, but as the heat of reaction is considerable, steps must be taken to abduct it since otherwise side reactions and an evaporation of bromine would occur. In order to avoid these difficulties it has been proposed to introduce the unsaturated compounds not into liquid bromine, but into a solution of bromine in an organic solvent, but this method involves additional difficulties in the separation of the brominated compound from the solvent under an additional consumption of heat.

As is well known to those skilled in the art, liquid bromine is usually recovered from certain mother liquors which also contain a small percentage of bromides. The most important source of bromine are the "footings" or mother liquors from the recrystallization of potassium minerals, for instance mixtures of kanite and sylvinite. Such footings, which as a rule contain one fourth to one half per cent of bromides, are treated with elementary chlorine, whereupon the bromine is separated in various ways.

According to the present invention, now, I do not separate the bromine from the footings treated with chlorine, but use this dilute watery solution of bromine as such for the bromination of unsaturated organic compounds, thus dispensing with the difficulties encountered both in separating the bromine and in the brominating step proper.

In carrying out my invention I brominate the unsaturated organic compound by bringing it into intimate contact with the dilute watery bromine solution, preferably in countercurrent. As the brominated organic compounds are as a rule altogether insoluble in water, they may readily be separated from the exhausted bromine solution, and in view of the considerable proportion of water present during the brominating step no provisions for abducting the heat of reaction are necessary.

The exhausted bromine solution is practically worthless and may go to waste, no separate step for recovering an organic solvent therefrom being necessary.

The reaction vessel used in the brominating step should be chosen so as to bring about a very intimate contact between the reaction components. A reaction tower containing a suitable filler has been found satisfactory. I introduce the organic compound such as ethylene or acetylene near the bottom of such tower, and I wash this gas with the dilute bromine solution. If the rates of flow of the two components are suitably controlled, the exhausted bromine solution will be substantially free from bromine, and the unsaturated organic compound will be completely or almost completely converted into the corresponding brominated compound, which may be withdrawn from the bottom of the tower either periodically or continuously.

According to a preferred embodiment of my invention I facilitate and expedite the brominating reaction by introducing into the reaction vessel, preferably near its top also part of the already brominated compound, which is thus returned into the tower in cycle. I presume that this promoting effect is due to the fact that brominated organic compounds are particularly good solvents both for bromine and for the corresponding unsaturated compounds, but I do not wish to be tied down to this or any other explanation.

*Example 1*

As illustrated in the drawing in a purely diagrammatic manner, a mother liquor resulting from the recrystallization of potassium ores containing 0.3% Br. in the form of bromides is treated with the stoichiometric quantity of gaseous chlorine, and the dilute watery bromine solution thus obtained is supplied to the top of a reaction tower filled with a suitable filler. Near the bottom of this tower ethylene gas is introduced which passes upwardly through the filler. The liquid collecting at the bottom of the vessel separates into two layers, the upper layer consisting of exhausted watery solution, which is discharged and goes to waste, while the lower oily layer consists of liquid ethylene dibromide, in which some elementary bromine is dissolved. This oily layer is withdrawn periodically or continuously and can be freed from elementary bromine by fractional distillation.

The rates of flow of the ethylene and of the watery bromine solution are regulated to obtain an exhausted solution substantially free from bromine. If some unconverted ethylene should collect near the top of the reaction vessel, it can be passed through liquid bromine.

In addition to the watery bromine solution part of the brominated compound withdrawn from the bottom of the reaction vessel is returned to the top of this vessel, whereby the permissible rate of flow of the reaction components is materially increased.

*Example 2*

A watery bromine solution as described with reference to Example 1 is supplied to the top of a reaction vessel, together with some ethylene tetrabromide, in countercurrent to acetylene ($C_2H_2$), which is introduced into the vessel near its bottom. While the bromine solution is substantially exhausted on its way through the vessel, the acetylene is converted into ethylene tetrabromide ($CHBr_2.CHBr_2$), which collects as a heavy oily layer at the bottom of the vessel, whence it may be withdrawn and partly returned to the top of the vessel.

Various changes may be made in the details disclosed in the foregoing specification without departing from the invention or sacrificing the advantages thereof.

I claim:—

1. The method of producing brominated organic compounds from the corresponding unsaturated compounds comprising washing the compound to be brominated with a dilute watery solution of elementary bromine, and with some of the corresponding brominated compound in counter-current, separating the exhausted bromine solution from the brominated compound and re-using at least part of the latter in cycle.

2. The method of producing brominated organic compounds from the corresponding unsaturated compounds comprising washing the compound to be brominated with a dilute watery solution of elementary bromine, and with some of the corresponding brominated compound in counter-current, separating the exhausted bromine solution from the brominated compound, re-using at least part of the latter in cycle and controlling the rates of flow of the compound to be brominated and of the watery bromine solution so as to substantially exhaust the latter.

3. The method of producing brominated organic compounds from the corresponding unsaturated compounds comprising washing the compound to be brominated with a dilute watery solution of elementary bromine, and with some of the corresponding brominated compound in countercurrent, separating the exhausted bromine solution from the brominated compound, re-using at least part of the latter in cycle, controlling the rates of flow of the compound to be brominated and of the watery bromine solution to substantially exhaust the latter, and brominating the residual unsaturated compound with liquid bromine.

4. The method of brominating unsaturated organic compounds comprising treating a salt liquor containing a bromide with the stoichiometric quantity of chlorine gas and bringing the watery solution of elementary bromine thus obtained in intimate contact with said unsaturated organic compound and separating the exhausted bromine solution from the brominated compound.

OSKAR KASELITZ.